United States Patent
Ferris et al.

(10) Patent No.: US 6,609,385 B1
(45) Date of Patent: Aug. 26, 2003

(54) REFRIGERANT CHARGING/PRESSURE TESTING HOSE ASSEMBLY

(75) Inventors: James E. Ferris, Richardson, TX (US); William J. Quest, Dallas, TX (US)

(73) Assignee: E.F. Products, Inc., Kaufman, TX (US)

( * ) Notice: Subject to any disclaimer, the term of this patent is extended or adjusted under 35 U.S.C. 154(b) by 0 days.

(21) Appl. No.: 10/280,041

(22) Filed: Oct. 24, 2002

(51) Int. Cl.⁷ .................................. F25B 45/00
(52) U.S. Cl. .................. 62/77; 62/149; 62/292
(58) Field of Search .................. 62/77, 149, 292, 62/125, 129; 141/311 R, 348

(56) References Cited

U.S. PATENT DOCUMENTS

| | | | |
|---|---|---|---|
| 3,712,113 A | 1/1973 | Roscoe | 73/37 |
| 3,813,893 A | 6/1974 | Gemender et al. | 62/129 |
| 3,916,641 A | 11/1975 | Mullins | 62/292 |
| 3,976,110 A | 8/1976 | White | 141/346 |
| 3,996,765 A | 12/1976 | Mullins | 62/292 |
| 4,103,534 A | 8/1978 | Hoof | 73/37 |
| 4,404,850 A | 9/1983 | Hickmann | 73/161 |
| 4,494,402 A | 1/1985 | Carney | 73/40 |
| 4,884,410 A | 12/1989 | Bell et al. | 62/77 |
| 6,446,453 B1 | 9/2002 | Trachtenberg | |

OTHER PUBLICATIONS

Technical Chemical Company Product Brochure, Apr. 1986.

*Primary Examiner*—Chen-Wen Jiang
(74) *Attorney, Agent, or Firm*—Meyertons, Hood, Kivlin, Kowert & Goetzel, P.C.; Eric B. Meyertons

(57) ABSTRACT

A refrigerant charging/pressure testing hose assembly meeting SAE standard J2196 is useable to both (1) check the pressure in a refrigerant circuit and, (2) if necessary, add refrigerant to the circuit. The assembly includes a length of refrigerant charging, hose having a quick disconnect coupler disposed at one end and connectable to a service fitting portion of the circuit, a piercing-type shutoff valve disposed at the other hose end and connectable to a refrigerant charging canister, a pressure gauge installed in a longitudinally intermediate portion of the hose, and a check valve installed in the hose between the shutoff valve and the pressure gauge and permitting flow through the hose only toward the quick coupler.

16 Claims, 1 Drawing Sheet

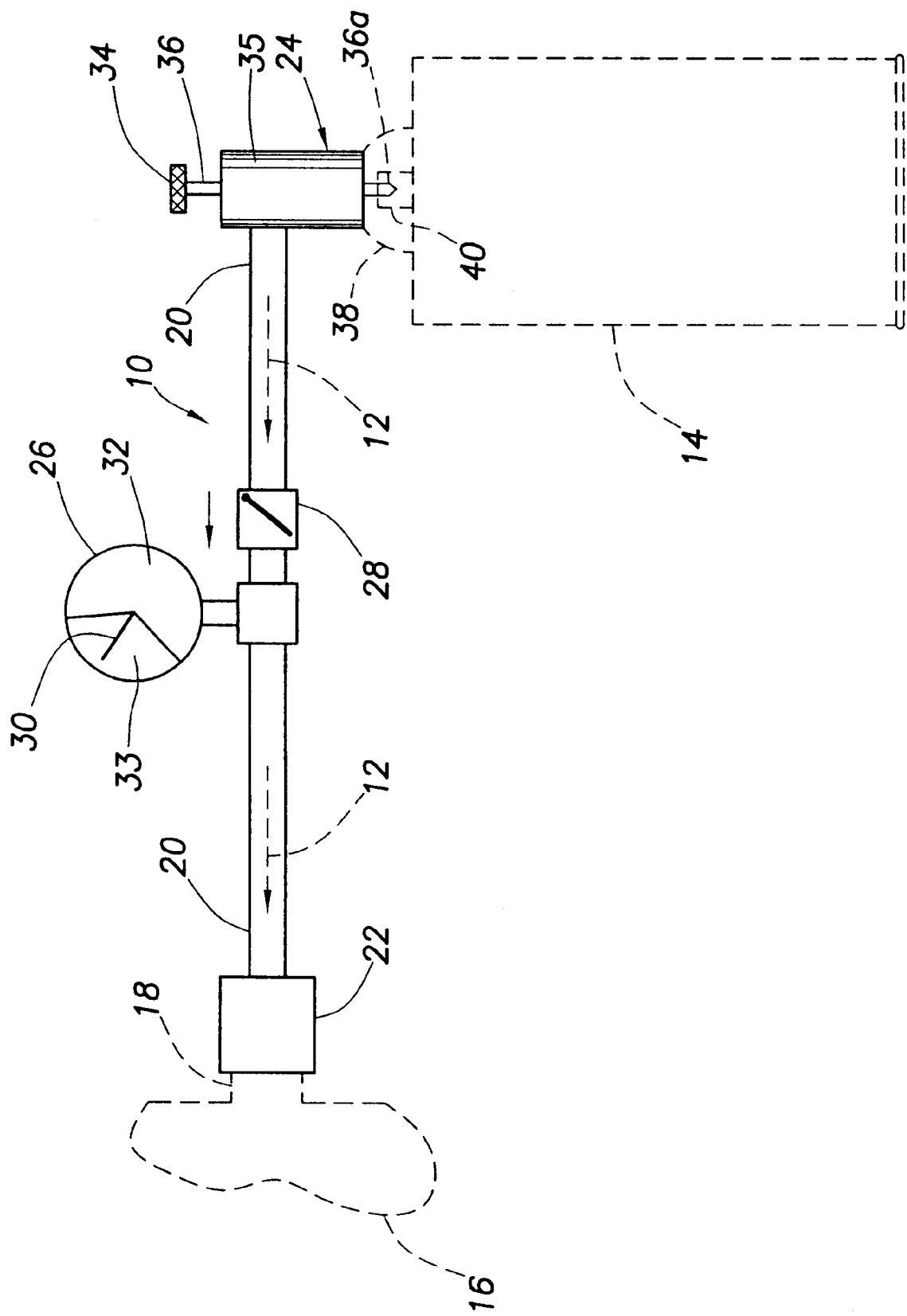

REFRIGERANT CHARGING/PRESSURE TESTING HOSE ASSEMBLY

BACKGROUND OF THE INVENTION

The present invention generally relates to refrigerant charging apparatus and, in a preferred embodiment thereof, more particularly provides a specially designed refrigerant charging/pressure testing hose assembly useable to charge a refrigerant circuit.

A common technique for checking the refrigerant charge of a refrigerant circuit, for example in an automotive vehicle air conditioning system, and adding a relatively small quantity of refrigerant to the circuit if necessary, is to first check the pressure within the circuit by providing a hose with a pressure gauge operatively connected thereto, coupling an end of the hose to a service fitting portion of the circuit and then reading the pressure gauge. If the pressure gauge reading indicates that additional refrigerant needs to be added to the circuit, the pressure gauge hose is removed from the service fitting, and a separate charging hose assembly is used to add refrigerant to the circuit.

The charging hose assembly typically includes a coupling at one end which is releasably securable to the service fitting, and a shutoff valve at its opposite end that may be secured to the outlet of a pressurized refrigerant container. The coupling is secured to the service fitting, and the valve is opened to flow refrigerant into the circuit. After this is done, the charging hose assembly is removed from the service fitting, and the pressure gauge hose is again connected to the service fitting to provide a pressure reading indicative of the new refrigerant charge level in the circuit.

If the pressure reading is not sufficiently high, the pressure gauge hose assembly is removed and the charging hose assembly reattached to the service fitting to add still more refrigerant to the circuit. The circuit is then pressure tested again using the separate pressure gauge hose assembly. These two separate steps are repeated, using the separate hose assemblies, until the measured pressure within the circuit indicates that the circuit is adequately charged with refrigerant.

This conventionally required use of separate pressure reading and refrigerant charging hose assemblies to check and adjust the refrigerant charge in a refrigerant circuit such as an automotive air conditioning system tends to be both tedious and time consuming. A need thus exists for improved apparatus and methods for measuring the pressure of a refrigerant circuit and adding refrigerant thereto if necessary it is to this need that the present invention is directed.

SUMMARY OF THE INVENTION

In carrying out principles of the present invention, in accordance with a preferred embodiment thereof, a specially designed refrigerant charging/pressure testing assembly is provided for use in charging and pressure testing a refrigerant circuit, such as in an automotive air conditioning circuit, having a service inlet fitting.

The assembly, which representatively complies with SAE standard J2196, is interconnectable between the service fitting and an outlet portion of a pressurized refrigerant container and, in a preferred embodiment thereof, comprises (1) a conduit, representatively a length of flexible refrigerant charging hose, having first and second ends; (2) a coupling structure, representatively a quick disconnect fitting, secured to the first conduit end and being connectable to the service fitting; (3) a shutoff valve, representatively a piercing-type shutoff valve, secured to the second conduit end and being connectable to the refrigerant container outlet portion; (4) a pressure gauge connected in the conduit between the coupling structure and the shutoff valve and being communicated with the interior of the conduit; and (5) a check valve connected in the conduit between the pressure gauge and the shutoff valve, the check valve being operative to block fluid flow therethrough toward the shutoff valve.

To check the adequacy of the refrigerant charge in the circuit, the coupling structure is simply connected to the service fitting of the circuit and the pressure gauge is read. Illustratively, and not by way of limitation, the pressure gauge is a dial-type gauge having a face on which a normal pressure range is marked, such range being indicative of an adequate refrigerant charge in the circuit. Thus, when the gauge needle is within the marked normal range, the circuit does not need an additional refrigerant charge.

If the circuit does need additional refrigerant (and the shutoff valve has not been previously connected to the refrigerant container outlet) the shutoff valve is connected to the refrigerant container outlet and used, representatively by opening and closing it to inject separate amounts of refrigerant from the container into the circuit via the conduit, until the gauge pressure indicates that the circuit is adequately charged.

Using conventional apparatus and methods, this circuit pressure testing and refrigerant charging process previously required two items of equipment—(1) a pressure gauge and associated hose, and (2) a separate charging hose which was used in conjunction with a refrigerant supply canister if additional refrigerant was needed in the circuit as indicated by the prior use of the separate pressure gauge/hose assembly. By using the specially designed refrigerant charging/ pressure testing assembly of the present invention, this previous necessity of testing the circuit pressure with one structure and then removing the first structure and replacing it with a second structure used to add refrigerant, if needed, to the circuit is eliminated.

The refrigerant charging/pressure testing assembly thus advantageously provides for easier and quicker refrigerant checking and charging compared to conventional techniques and apparatus. The assembly permits the addition of refrigerant to the circuit in metered amounts, does not require the disconnection of the charging hose to measure pressure, and eliminates guesswork with respect to the amount of additional refrigerant needed by the circuit.

BRIEF DESCRIPTION OF THE DRAWING

The single drawing herein schematically depicts a specially designed refrigerant charging/pressure testing hose assembly embodying principles of the present invention and being used to flow pressurized refrigerant from a refrigerant supply canister into an automotive air conditioning circuit through a service fitting portion of the circuit.

DETAILED DESCRIPTION

As indicated in the single drawing herein, this invention provides a refrigerant charging/pressure testing hose assembly 10 adapted to flow pressurized refrigerant 12 from a suitable canister 14 or other container into an air conditioning circuit, representatively an automotive vehicle air conditioning circuit 16, through a service fitting portion 18 of the circuit.

Assembly 10 includes a length of flexible charging hose 20 having a quick disconnect fitting 22 or other suitable coupling device at its left end and a shutoff valve, representatively a piercing-type shutoff valve 24, at its right end, a pressure gauge 26 connected in a longitudinally intermediate portion of the hose 20, and a check valve 28 connected in the hose 20 between the pressure gauge 26 and the shutoff valve 24. Illustratively, the assembly 10 complies with SAE standard J2196, with the shutoff valve 24 being within 30 cm of the quick disconnect fitting 22.

The pressure gauge 26 is representatively a dial-type pressure gauge having a pressure indicating needle 30, and a face 32 with a "normal range" 33 (indicating a normal pressure range when the circuit is adequately charged with refrigerant) suitably indicated thereon. Check valve 28 permits only leftward flow of the refrigerant 12 through the hose 20, as indicated by the arrow directly above the check valve 28. Shutoff valve 24 has a rotatable handle 34 on the top end of its body 35, handle 34 being connected to a stem 36 rotatably secured to the body 35 and having a lower piercing end 36a. Canister 14 has an open-topped upper end 38 with an interior pierceable outlet portion 40.

The assembly 10 may be used Without the canister 14, to check the pressure within the air conditioning circuit 16, and thus quickly determine whether it is adequately charged with refrigerant or needs to have refrigerant added thereto, by simply connecting the quick disconnect fitting 22 to the service fitting 18 and then reading the pressure gauge 26 to quickly determine whether the circuit 16 needs additional refrigerant. When the quick disconnect fitting 22 is connected to the service fitting 18, the check valve 28 prevents fluid flow rightwardly past the valve 28, thereby assuring an accurate pressure reading.

To use the assembly 10 for the first time in conjunction with the unopened canister 14, the shutoff valve 24 is readied for its initial connection to the canister 14 by rotating the handle 24 to upwardly retract the stem 36, and the valve body 35 is secured to the pierceable canister portion 40. The quick disconnect fitting 22 at the other end of the hose 20 is then removably secured to the refrigerant circuit service fitting 18. At this point, there is no communication between the interior of the canister 14 and the interior of the hose 20.

Upon connection of the disconnect fitting 22 to the service fitting 18, the gauge needle 30 will indicate the pressure within the air conditioning circuit 16. If the needle 30 is within the normal range 33, no refrigerant needs to be added to the circuit 16, and the disconnect fitting 22 is removed from the service fitting 18.

However, if the gauge needle 30 is below the range 33 the shutoff valve handle 34 is rotated in one direction to downwardly drive the lower stem end 36a to pierce the canister portion 40, and then rotated in the opposite direction to communicate the interior of the canister 14 with the interior of the hose 20. In this manner, refrigerant 12 is caused to flow leftwardly through the hose 20 and into the circuit 16 through the service fitting 18. After a quantity of refrigerant is forced into the circuit 16 in this manner, the valve handle 34 is rotated to close the shutoff valve 24 and thereby permit the pressure gauge 26 to provide a reading indicating the new, higher level of refrigerant charge within the circuit 16. If this initially added quantity of refrigerant does not cause the pressure gauge needle 30 to move into the "normal" gauge zone 33 the valve 34 is re-opened, to permit more refrigerant to be forced into the circuit 16, and then closed to provide a refrigerant charge-indicative pressure reading on the gauge 26.

When the gauge pressure reading is satisfactory, the quick disconnect fitting 22 is removed from the service fitting of the now correctly charged circuit 16. In a conventional manner, the quick disconnect fitting 22, when removed from the service fitting 18, snaps shut to prevent refrigerant outflow therethrough from the canister 14 in the event that the operator neglects to close the shutoff valve 24 before uncoupling the quick disconnect fitting 22 from the service fitting 18.

Using conventional apparatus and methods, this circuit pressure testing and refrigerant charging process previously required two items of equipment—(1) a pressure gauge and associated hose, and (2) a separate charging hose which was used in conjunction with a refrigerant supply canister if additional refrigerant was needed in the circuit as indicated by the prior use of the separate pressure gauge/hose assembly. By using the specially designed assembly 10, this previous necessity of testing the circuit pressure with one structure and then removing the first structure and replacing it with a second structure used to add refrigerant, if needed, to the circuit is eliminated. Accordingly, as can be readily seen from the foregoing, the assembly 10 advantageously provides for easier and quicker refrigerant checking and charging compared to conventional techniques and apparatus. The assembly 10 permits the addition of refrigerant to the circuit 16 in metered amounts, does not require the disconnection of the charging hose 20 to measure pressure, and eliminates guesswork with respect to the amount of additional refrigerant needed by the circuit 16.

The foregoing detailed description is to be clearly understood as being given by way of illustration and example only, the spirit and scope of the present invention being limited solely by the appended claims.

What is claimed is:

1. For use in charging and pressure testing a refrigerant circuit having an inlet fitting, a refrigerant charging/pressure testing assembly interconnectable between the inlet fitting and an outlet portion of a pressurized refrigerant container, said refrigerant charging/pressure testing assembly comprising:

a conduit having first and second ends;

a coupling structure secured to said first end of said conduit and being connectable to the refrigerant circuit inlet fitting;

a shutoff valve secured to said second end of said conduit and being connectable to the refrigerant container outlet portion;

a pressure gauge connected in said conduit between said coupling structure and said shutoff valve and being communicated with the interior of said conduit; and a check valve connected in said conduit between said pressure gauge and said shutoff valve, said check valve being operative to block fluid flow therethrough toward said shutoff valve.

2. The refrigerant charging/pressure testing assembly of claim 1 wherein:

said conduit is a length of flexible refrigerant charging hose.

3. The refrigerant charging/pressure testing assembly of claim 1 wherein:

the inlet fitting is a service fitting, and said coupling structure is a quick disconnect type coupling structure.

4. The refrigerant charging/pressure testing assembly of claim 1 wherein:

said shutoff valve is a piercing-type shutoff valve.

5. The refrigerant charging/pressure testing assembly of claim 1 wherein:

said pressure gauge is a dial-type pressure gauge.

6. The refrigerant charging/pressure testing assembly of claim 5 wherein:

said dial-type pressure gauge has a face with a normal range marked thereon and being indicative of an adequate refrigerant charge in a refrigerant circuit to which said refrigerant charging/pressure testing assembly is operatively coupled.

7. The refrigerant charging/pressure testing assembly of claim 1 wherein:

said pressure gauge visually provides an indicia of an adequate refrigerant charge range in the refrigerant circuit to which said refrigerant charging/pressure testing assembly is operatively coupled.

8. The refrigerant charging/pressure testing assembly of claim 1 wherein:

said assembly complies with SAE standard J2196.

9. For use in charging and pressure testing an air conditioning system having a service fitting, a refrigerant charging/pressure testing assembly interconnectable between the inlet fitting and a pierceable outlet portion of a pressurized refrigerant canister, said refrigerant charging/pressure testing assembly comprising:

a length of flexible refrigerant charging hose;

a quick disconnect coupler secured to said first end of said hose and being releasably connectable to the service fitting;

a piercing-type shutoff valve secured to said second end of said conduit and being releasably connectable to the canister outlet portion;

a pressure gauge connected in said hose between said quick disconnect coupler and said shutoff valve; and a check valve connected in said hose between said pressure gauge and said shutoff valve, said check valve being operative to block fluid flow therethrough toward said shutoff valve.

10. The refrigerant charging/pressure testing assembly of claim 9 wherein:

said pressure gauge is a dial-type pressure gauge having a face with a normal range marked thereon and being indicative of an adequate refrigerant charge in an air conditioning circuit to which said refrigerant charging/pressure testing assembly is operatively coupled.

11. The refrigerant charging/pressure testing assembly of claim 10 wherein:

said assembly complies with SAE standard J2196.

12. A method of pressure testing and charging a refrigerant circuit having an inlet fitting, said method comprising the steps of:

providing a refrigerant charging/pressure testing assembly having a conduit with first and second ends, a coupling structure secured to said first end, a shutoff valve secure to said second end, a pressure gauge connected in said conduit between said coupling structure and said shutoff valve, and a check valve connected in said conduit between said pressure gauge and said shutoff valve, said check valve being operative to block fluid flow therethrough toward said shutoff valve;

connecting said coupling structure to said inlet fitting; and determining the adequacy of the refrigerant charge in the refrigerant circuit by reading said pressure gauge.

13. The method of claim 12 further comprising the step of:

connecting said shutoff valve to an outlet portion of a pressurized refrigerant container.

14. The method of claim 13 further comprising the step of:

using said shutoff valve to flow refrigerant from said container into said refrigerant circuit through said conduit until the pressure gauge reading is indicative of an adequate refrigerant charge in said refrigerant circuit.

15. The method of claim 14 wherein:

the pressure gauge has a visual normal pressure range marked thereon, and said using step is performed by using said shutoff valve until the pressure gauge reading is in said normal range.

16. The method of claim 14 wherein:

said using step is performed by alternately opening and closing said shutoff valve, to thereby flow separate amounts of refrigerant from said container into said circuit, until the pressure gauge reading is indicative of an adequate refrigerant charge in said refrigerant circuit.

* * * * *